US010674368B2

(12) United States Patent
Kang et al.

(10) Patent No.: US 10,674,368 B2
(45) Date of Patent: Jun. 2, 2020

(54) METHOD AND APPARATUS FOR COMMUNICATION USING LICENSED BAND AND UNLICENSED BAND

(71) Applicant: Samsung Electronics Co., Ltd., Gyeonggi-do (KR)

(72) Inventors: Dae Ho Kang, Gyeonggi-do (KR); Sung Jin Park, Seoul (KR); Hyung Yeol Lee, Seoul (KR); Won Joon Cho, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 31 days.

(21) Appl. No.: 15/802,592

(22) Filed: Nov. 3, 2017

(65) Prior Publication Data
US 2018/0124613 A1 May 3, 2018

(30) Foreign Application Priority Data
Nov. 3, 2016 (KR) .................. 10-2016-0146039

(51) Int. Cl.
*H04W 16/14* (2009.01)
*H04W 28/18* (2009.01)
*H04W 72/04* (2009.01)
*H04L 1/18* (2006.01)
*H04L 1/08* (2006.01)
(Continued)

(52) U.S. Cl.
CPC ............ *H04W 16/14* (2013.01); *H04B 1/713* (2013.01); *H04L 1/08* (2013.01); *H04L 1/1819* (2013.01); *H04L 1/1874* (2013.01); *H04W 28/18* (2013.01); *H04W 48/16* (2013.01); *H04W 72/0413* (2013.01); *H04W 72/0453* (2013.01); *H04W 72/02* (2013.01); *H04W 76/15* (2018.02)

(58) Field of Classification Search
CPC . H04W 16/14; H04W 28/18; H04W 72/0453; H04W 48/16; H04W 72/0413; H04B 1/713
See application file for complete search history.

(56) References Cited

U.S. PATENT DOCUMENTS 8,874,124 B2 10/2014 Clegg
9,031,017 B2 * 5/2015 Ratasuk ............ H04W 72/1215
370/329
(Continued)

FOREIGN PATENT DOCUMENTS

WO 2013/126859 A2 8/2013

OTHER PUBLICATIONS

International Search Report dated Feb. 6, 2018.
European Search Report dated Jun. 13, 2019.

*Primary Examiner* — Yemane Mesfin
*Assistant Examiner* — Henry Baron
(74) *Attorney, Agent, or Firm* — Cha & Reiter, LLC

(57) ABSTRACT

Disclosed is an electronic device. The electronic device includes a processor, and a communication circuit that communicates with a base station via a licensed band and an unlicensed band. The communication circuit transmits a first transport block having a first redundancy version (RV) and including transmission data to the base station through the licensed band and transmits a second transport block having a second RV and including the transmission data to the base station through the unlicensed band.

14 Claims, 8 Drawing Sheets

(51) Int. Cl.
*H04B 1/713* (2011.01)
*H04W 48/16* (2009.01)
*H04W 76/15* (2018.01)
*H04W 72/02* (2009.01)

(56) References Cited

U.S. PATENT DOCUMENTS

| | | | |
|---|---|---|---|
| 9,078,278 B2 | 7/2015 | Nimbalker et al. | |
| 9,191,413 B2 | 11/2015 | Obaidi | |
| 9,258,811 B2 | 2/2016 | Koskela et al. | |
| 9,591,633 B2 | 3/2017 | Clegg | |
| 9,775,087 B2 | 9/2017 | Chou et al. | |
| 9,794,794 B2 | 10/2017 | Clegg | |
| 9,967,752 B2 * | 5/2018 | Luo | H04W 16/14 |
| 2012/0176996 A1 * | 7/2012 | Kim | H04W 72/0413 370/329 |
| 2013/0106980 A1 | 5/2013 | Obaidi | |
| 2013/0176981 A1 | 7/2013 | Earnshaw et al. | |
| 2013/0337821 A1 | 12/2013 | Clegg | |
| 2014/0036818 A1 | 2/2014 | Koskela et al. | |
| 2014/0198758 A1 | 7/2014 | Nimbalker et al. | |
| 2014/0362780 A1 | 12/2014 | Malladi et al. | |
| 2015/0009869 A1 | 1/2015 | Clegg | |
| 2015/0009962 A1 | 1/2015 | Clegg | |
| 2015/0092703 A1 | 4/2015 | Xu et al. | |
| 2015/0124740 A1 | 5/2015 | Chen et al. | |
| 2015/0172931 A1 | 6/2015 | Jose et al. | |
| 2015/0256303 A1 | 9/2015 | Belghoul et al. | |
| 2015/0334712 A1 | 11/2015 | Maaref et al. | |
| 2016/0119846 A1 | 4/2016 | Chou et al. | |
| 2017/0070912 A1 * | 3/2017 | Kozat | H04W 16/14 |
| 2017/0094529 A1 | 3/2017 | Clegg | |
| 2017/0257777 A1 | 9/2017 | Clegg | |
| 2017/0265084 A1 | 9/2017 | Clegg | |
| 2018/0049109 A1 * | 2/2018 | Sunay | H04W 48/16 |
| 2018/0242280 A1 * | 8/2018 | Axmon | H04L 1/0001 |

* cited by examiner

METHOD AND APPARATUS FOR COMMUNICATION USING LICENSED BAND AND UNLICENSED BAND

CLAIM OF PRIORITY

This application claims the benefit under 35 U.S.C. § 119(a) of a Korean patent application filed on Nov. 3, 2016 in the Korean Intellectual Property Office and assigned Serial number 10-2016-0146039, the entire disclosure of which is hereby incorporated by reference.

TECHNICAL FIELD

The present disclosure relates to a technology for transmitting data by using a licensed band and an unlicensed band.

BACKGROUND

Wireless mobile devices are capable of receiving voice and data services by accessing a base station in a communication system over a communication link using a licensed band. However, as the amount of data increases for various data services, there is a need for greater transmission speeds.

These and other short-comings of conventional systems will become apparent through comparison of such system with various aspects of the following embodiments as set forth in the remainder of this disclosure and drawings.

SUMMARY

One way to increase a data transmission speed in a wireless mobile communication system is to use a relatively wide bandwidth. For example, in long-term evolution (LTE), it may be possible to increase a transmission or reception speed by using a carrier aggregation (CA) technology for combining a plurality of component carriers (CC).

Licensed-assisted accessing using LTE (LAA) and enhanced licensed-assisted accessing using LTE (eLAA) technologies can increase the transmission speed by using a part of the unlicensed band as a component carrier. For example, a terminal connects to a network by using a component carrier corresponding to the licensed band and is provided with a wireless communication service. The terminal may aggregate a component carrier of the licensed band and a component carrier corresponding to the unlicensed band under control of a base station so as to be used for downlink data transmission LAA and uplink data transmission eLAA.

However, while the terminal may exclusively use the licensed band (according to multiple access rules set forth by the base station), anyone may legally use resources of the unlicensed band. Accordingly, the terminal can perform a clear channel assessment (CCA) check operation for checking whether any other transmission using the unlicensed band is made prior to using the resources of the unlicensed band. This is referred to as a "listen-before-talk (LBT) procedure". If it is determined in the LBT procedure that the unlicensed band is already occupied, the terminal may fail to transmit using the unlicensed band and may go on stand-by.

Accordingly, in the eLAA uplink transmission, there may occur the following case: the terminal fails to attempt data transmission if the result of LBT procedure performed on an unlicensed band allocated from the base station indicates that a relevant channel is already occupied. In this case, a transport block that the terminal intends to transmit may fail to be transmitted to the base station immediately through a resource of the unlicensed band allocated from the base station and may be transmitted after an additional resource allocation procedure in the unlicensed band. This may cause a delay of the data transmission and an increase in signaling overhead.

Aspects of the present disclosure may address at least the above-mentioned problems and/or disadvantages and may provide at least some of the advantages described below. Accordingly, an aspect of the present disclosure is to provide a method and an apparatus for communication using an unlicensed band.

In accordance with an aspect of the present disclosure, an electronic device may include a processor, and a communication circuit that communicates with a base station via a licensed band and an unlicensed band. The communication circuit may transmit a first transport block having a first redundancy version (RV) and including transmission data to the base station through the licensed band and may transmit a second transport block having a second RV and including the transmission data to the base station through the unlicensed band.

In accordance with another aspect of the present disclosure, an electronic device may include a processor, and a communication circuit configured to communicate with a base station via a licensed band and an unlicensed band. The communication circuit may transmit a first transport block including first transmission data to the base station through the licensed band and may transmit a second transport block including second transmission data to the base station through the unlicensed band. The first transmission data and the second transmission data are different data in a first transmission mode and the first transmission data and the second transmission data are the same data in a second transmission mode. In accordance with another aspect of the present disclosure, a data transmitting method of a terminal may include transmitting, when a transmission mode of the terminal is a first transmission mode, a first transport block including first transmission data to a base station through a licensed band and transmitting a second transport block including second transmission data different from the first transmission data to the base station through an unlicensed band, and transmitting, when the transmission mode of the terminal is a second transmission mode, the first transport block to the base station through the licensed band and transmitting the second transport block including second transmission data the same as the first transmission data to the base station through an unlicensed band.

According to various embodiments of the present disclosure, a terminal may dynamically utilize data transmission using a licensed band and an unlicensed band in consideration of the quality of signal of the licensed band, data traffic, quality of service (QoS) requirements, and the like.

Accordingly, use efficiency of a wireless resource in the unlicensed band and quality of experience (QoE) of a user may be improved.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
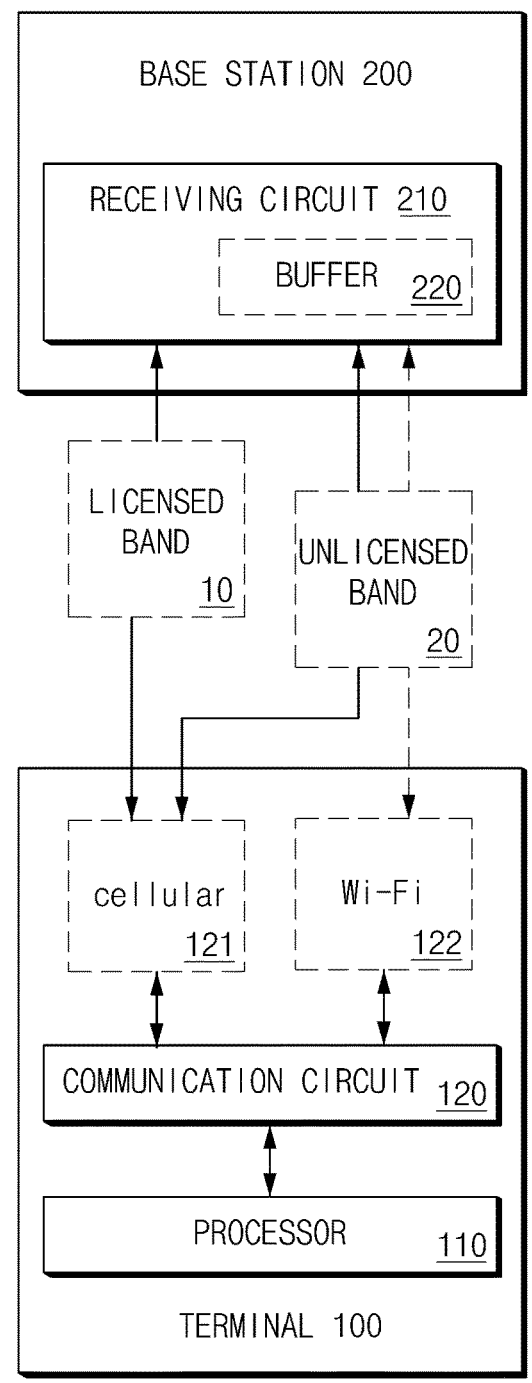
FIG. 1 illustrates a network environment using an unlicensed band, according to an embodiment of the present disclosure.

Below, various embodiments of the present disclosure will be described with reference to accompanying drawings. However, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

Hereinafter, an electronic device according to various embodiments will be described with reference to the accompanying drawings. The term "user" used herein may refer to a person who uses an electronic device or may refer to a device (e.g., an artificial intelligence electronic device) that uses an electronic device.

1. Communication Environment

FIG. 1 illustrates a network environment using an unlicensed band, according to an embodiment of the present disclosure.

Referring to FIG. 1, a terminal 100 may communicate with a base station 200 through a licensed band 10 and an unlicensed band 20. The licensed band 10 may correspond to a frequency band that the terminal 100 authenticated by a network operator is able to access exclusively. The unlicensed band 20 may correspond to a frequency band that all terminals are able to legally access freely. For example, in North America, a terminal that subscribes to the AT&T network operator may access to a frequency band of 850 MHz, but all terminals may access to a Wi-Fi network of a frequency band of 2.4 GHz or 5 GHz. In this case, the terminal 100 may use the frequency band of 850 MHz as the licensed band 10 and, simultaneously, may provide an additional data communication link by making use of a technology, such as Wi-Fi, LTE-U, LTE-LAA (Licensed Assisted Access), LTE-eLAA (enhanced Licensed Assisted Access), or the like, in the unlicensed band 20. For example, the unlicensed band can be a frequency band that does not require a license for usage under the Part 15 rules of the Federal Communication Commission (FCC), 47 C.F.R. 15.

The terminal 100 may include a processor 110 and a communication circuit 120. In an embodiment, the processor 110 may be referred to as an "application processor (AP)", and the communication circuit 120 may be referred to as a "communication processor (CP)". The communication circuit 120 may include a first module to support the licensed band 10 and the unlicensed band 20 at the same time and a second module to support the unlicensed band 20 or may be electrically connected with the first module and the second module. For example, the first module may corresponds to a cellular module 121 to which a technology, which supports concurrent transmission through the licensed band 10 and the unlicensed band 20, such as LTE-U, LTE-LAA, LTE-eLAA, or the like is applied, and the second module may correspond to a Wi-Fi module 122 to provide data communication by using only the unlicensed band 20.

The cellular module 121 may include an antenna that transmits/receives a signal of a frequency band corresponding to a cellular network and a signal of a frequency band corresponding to the unlicensed band 20 (e.g., Wi-Fi) and an amplification circuit, a filter circuit, and the like for signal processing. The Wi-Fi module 121 may include an antenna that transmits/receives a signal of a frequency band corresponding to a Wi-Fi network and an amplification circuit, a filter circuit, and the like for signal processing. In an embodiment, the cellular module 121 and the Wi-Fi module 122 may be implemented with a radio frequency (RF) block included in the communication circuit 120.

Besides, the terminal 100 may further include elements, which are not illustrated in FIG. 1, such as a memory and a display.

The base station 200 may process data received from the terminal 100. The base station 200 may include one or more base stations. Also, in this specification, the base station 200 may be understood as or replaced with a receiving side or a receiving terminal depending on a situation. For example, a receiving circuit 210 may receive data through the licensed band 10 or the unlicensed band 20, may verify the received data, and may transmit the data to an upper layer or may transmit ACK (acknowledge) or NACK (non-ACK) to the terminal 100.

The base station 200 may further include a control unit that controls overall operations of the base station 200. The control unit may be implemented with a plurality of processors. The control unit may perform scheduling of the terminal 100 connecting to the base station 200, allocation of wireless resources that the terminal 100 is able to use, and the like.

2. Transmission Mode

The terminal 100 may transmit data to the base station 200 through the cellular module 121 by using the licensed band 10 and the unlicensed band 20 at the same time. For example, data transmission in a media access control (MAC) layer of the Open System Interconnection (OSI) model may be performed in units of transport blocks depending on a hybrid automatic repeat request (HARQ) operation. The terminal 100 may construct the transport block in the licensed band 10 and the unlicensed band 20 differently depending on the transmission mode. Below, a diversity mode and a multiplexing mode will be described as exemplary transmission modes with reference to FIG. 2.

2.1. Diversity Mode

In this specification, a transmission mode to transmit the same data in the licensed band 10 and the unlicensed band 20 is referred to as the diversity mode.

Figure 2:
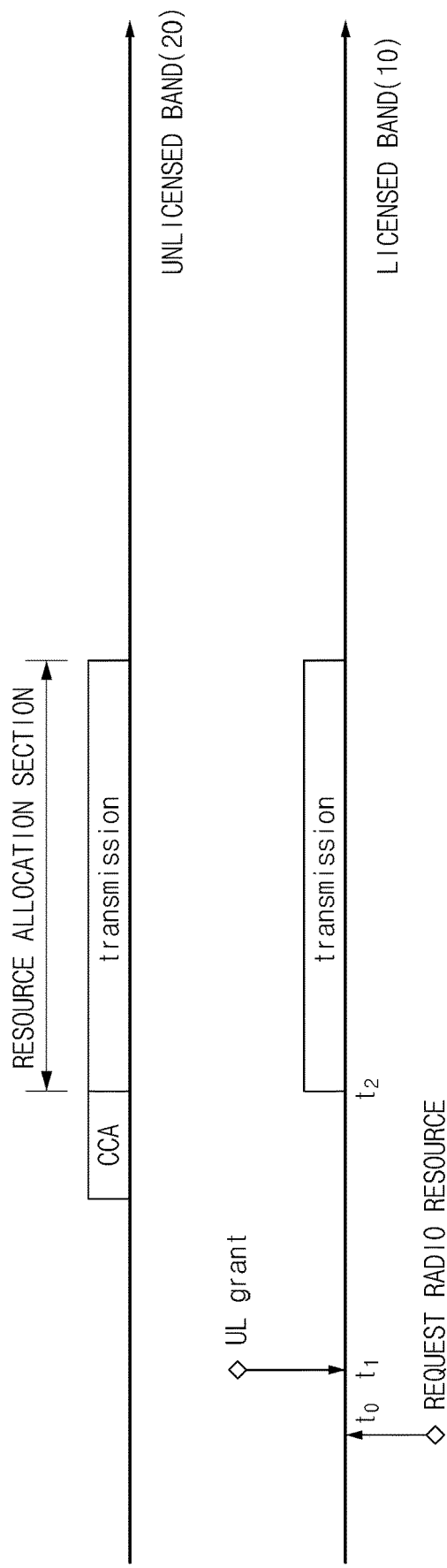
FIG. 2 illustrates a timing of data transmission of a licensed band and the unlicensed band, according to an embodiment of the present disclosure.

FIG. 2 is a timing diagram of data transmission using a licensed band and an unlicensed band.

At $t_0$, the terminal 100 may request (Request Radio Resource) a physical uplink shared channel (PUSCH) resource necessary for data transmission from the base station 200 when there is a need for traffic transmission through an uplink. For example, the terminal 100 may make a scheduling request (SR) from the base station 200. The terminal 100 may transmit the SR to the base station 200 through a control channel (e.g., a physical uplink control channel (PUCCH)) of a component carrier corresponding to the licensed band 10, or a control channel of a component carrier corresponding to the unlicensed band 20. As another example, if a previously allocated PUSCH exists, the terminal 100 may piggyback a buffer status report (BSR) on a PUSCH transmission so as to be transmitted to the base station 200. In this case, communication using a component carrier in the unlicensed band 20 may have been activated or may be activated after scheduling of a wireless resource by the base station 200.

At $t_1$, the base station 200 may transmit a permission "UL grant" to use a resource in response to the resource request from the terminal 100 at $t_0$. For example, if receiving the SR and/or BSR, the base station 200 may transmit, through a physical downlink control channel (PDCCH), permission (e.g., UL grant) information about a resource of the licensed band 10 and/or the unlicensed band 20 that the terminal 100 is able to use for uplink transmission. Here, the "UL grant" may be permission to use a wireless resource corresponding to a component carrier in the licensed band 10 and/or a component carrier in the unlicensed band 20. Additionally the base station 200 assign the UL grant to be applied to a single subframe or a plurality of subframes to the terminal 100. Also, temporal distributions of wireless resources of the licensed band 10 and the unlicensed band 20, which the base station 200 may assign to the terminal 100, may be different from each other when using time division multiplexing. However, in this specification, it may be assumed for convenience of description that respective wireless resources are present in a subframe of the same time.

At $t_2$, the terminal 100 is permitted send an uplink transmission. In the licensed band 10, the terminal 100 has exclusive access at $t_2$ and interference from other transmission is not an issue. However, in the unlicensed band 20, even though the UL grant includes a carrier in the unlicensed band, another device can legally transmit on the carrier. Transmission from another device on the carrier in the unlicensed band 20 can cause radio interference making it impossible for the terminal 100 to transmit to the base station 200.

To determine whether it is possible to transmit data at t2 in the unlicensed band 20, the terminal 100 may perform CCA by an LBT condition in a component carrier of the unlicensed band 20 immediately before t2. If the CCA execution result indicates that data transmission is impossible, uplink data transmission through the unlicensed band 20 in a relevant transmission interval may not be performed. If the CCA execution result indicates that data transmission is possible, the terminal 100 may transmit, in the unlicensed band 20, the same data as data transmitted in the licensed band 10.

If transmission data exists in the diversity mode, the terminal 100 may apply a channel coding procedure, such as channel coding, interleaving, and the like, to the transmission data to generate a bit stream. The bit stream may include data bits and parity bits. For example, assuming that in the terminal 100 a bit stream of data to be transmitted through an uplink is $b_k$, the terminal 100 may generate a plurality of bit streams $d_k^0, d_k^1, d_k^2, d_k^3$, etc. through channel coding, interleaving, or the like. The terminal 100 may store the plurality of bit streams generated in a circular buffer, may compose a transport block with a part of the plurality of bit streams, and may transmit the transport block to receiver circuit 210 of the base station 200 through a wireless resource allocated by the base station 200. Here, the transport block may be identified by using a redundancy version RV. For example, $d_k^0$, may be identified through RV0, and $d_k^1$ may be identified through RV1. Transport blocks corresponding to different RVs may include the same data bits and different parity bits. In the diversity mode, the terminal 100 may transmit the same data to the base station 200 in different coding forms by transmitting transport blocks having different RVs after allocating the transport blocks having different RVs to the licensed band 10 and the unlicensed band 20.

If the terminal 100 transmits data in the diversity mode, the base station 200 may attempt decoding by using a bit stream received through the licensed band 10 and a bit stream received through the unlicensed band 20. For example, the base station 200 may store a first bit stream received through the licensed band 10 in a buffer 220 (e.g., a soft buffer); if a second bit stream is received, the base station 200 may combine the first bit stream and the second bit stream to attempt decoding. In this case, since the first bit stream and the second bit stream may include the same data bits and different parity bits from each other, receiving the correct parity bits means that there is a higher probability of successful decoding, and a low probability of bit errors. Accordingly, the diversity mode may operate in a communication environment in which there is a risk of data loss, high bit error rate (BER), or minimization of data loss is required. For example, the terminal 100 may transmit data in the diversity mode when the quality of signal of the licensed band 10 decreases to a specific level or lower (e.g., a weak electric field situation) and/or upon transmitting data traffic needing the high quality, such as voice/image, to an uplink.

2.2. Multiplexing Mode

In the multiplexing mode, the terminal 100 may transmit a first bit stream using the licensed band 10 and may transmit a second bit stream including a different data bits from the first bit stream using the unlicensed band 20. For example the terminal 100 may perform channel coding, interleaving, etc. on data corresponding to a bit stream $b_1$ and data corresponding to a bit stream $b_2$ to generate a plurality of bit streams $d_1^0, d_1^1, d_1^2$ and $d_2^0, d_2^1, d_2^2$, etc. The terminal 100 may transmit $d_1^0, d_1^1$, and $d_1^2$ on the licensed band 10 and may transmit $d_2^0, d_2^1$, and $d_2^2$ on the unlicensed band 20.

Since the terminal 100 transmits different data through different channels in the multiplexing mode, the throughput or bit rate may increase.

If the terminal 100 transmits data in the multiplexing mode, the base station 200 may decode the bit stream received through the licensed band 10 and the bit stream received through the unlicensed band 20, respectively. In the case of decoding failure, the base station 200 may transmit "Not Acknowledged" (NACK) on the licensed band 10 and the unlicensed band 20, respectively.

The multiplexing mode and the diversity mode may work advantageously in different network environments. For example, in the case of the multiplexing mode, if a communication state of the licensed band 10 is good, the throughput or bit rate is improved. However, if the communication state is bad, transmission delays may occur due to frequent retransmission. In contrast, the diversity mode may transmit data stably even in a weak electric field situation.

Also, if a channel of the unlicensed band 20 is busy, the likelihood of transmission delays due to retransmission in the unlicensed band 20 may increase in the multiplexing mode. However, in the diversity mode, since the same data is transmitted in the licensed band 10 as the unlicensed band 20, retransmissions can be avoided, even when there is a transmission failure in the unlicensed band 20. Accordingly, the terminal 100 may dynamically determine which transmission mode to use depending on the situation. The transmission mode used can take into consideration various conditions such as electric field interference, unlicensed band channel complexity, and the like.

3. Selection of Uplink Transmission Mode

The uplink transmission mode can be specified or not specified. The uplink can be specified by either the base station or user setting. If the uplink transmission mode is not specified, the terminal 100 may determine the uplink transmission mode based on the network environment.

3.1. Case where Transmission Mode is Specified

In an embodiment, the terminal 100 may receive information about a transmission mode from the base station 200. For example, the base station 200 may add a field representing a transmission mode of the terminal 100 to an UL grant signaling message upon permitting uplink transmission to the terminal 100. For example, the field may have the size of 1 bit. If the field directs the multiplexing mode, the terminal 100 may transmit data in the multiplexing mode; if the field directs the diversity mode, the terminal 100 may perform data transmission in the diversity mode.

As another example, to specify the transmission mode, the base station 200 may utilize a field defined in the UL grant that is respectively transmitted to the terminal 100 with respect to a resource of the licensed band 10 and a resource of the unlicensed band 20. For example, according to the recently defined 3GPP Rel-14 standard, a downlink control information (DCI) format 0A/4A that means the UL grant on the unlicensed band 20, that is, contains PUSCH resource allocation information may be newly added. Here, a 3-bit carrier indicator field representing a carrier channel to which a relevant UL grant is applied, a 4-bit HARQ process number field representing a HARQ process taking charge of management of a transport block in an allocated PUSCH, and a 2-bit redundancy version field representing RV of a transport block that a base station intends to receive exist. According to an embodiment of the present disclosure, if appropriately combining and utilizing values of the fields, the base station 200 may notify the terminal 100 whether to use a PUSCH resource in the unlicensed band 20 in the multiplexing mode or in the diversity mode.

For example, if the base station 200 intends that the terminal 100 operates in the multiplexing mode, the base station 200 may transmit the UL grant, in which a new data indicator (NDI) field value is set to "1", to the terminal 100 on the licensed band 10 for the purpose of causing uplink transmission of new data on the licensed band 10. If receiving the UL grant in which the NDI field value is set to "1", the terminal 100 may transmit new data, which was not previously transmitted, by using the allocated PUSCH resource. In this case, if the base station 200 sets a carrier indicator field of the UL grant, which the base station 200 transmits to the terminal 100 in the unlicensed band 20, to a value representing a carrier of the unlicensed band 20, the terminal 100 that receives the UL grant may recognize that independent uplink transmission is possible in the unlicensed band 20 and may transmit a transport block including data different from data transmitted in the licensed band 10 to the base station 200 through the unlicensed band 20. That is, the terminal 100 may operate in the multiplexing mode.

If the base station 200 intends to specify the diversity mode to the terminal 100, by setting a carrier indication field value of the UL grant to be transmitted to the terminal 100 through the unlicensed band 20 to a carrier of a licensed band 10 to be applied to the diversity mode, a HARQ process number to a HARQ process number to be used in a carrier of the licensed band 10, and a redundancy version field to a different value from an RV value of a transport block to be transmitted in the carrier of the licensed band 10, the terminal 100 that receives the UL grant may transmit transport blocks, which has the same transmission data information as data transmitted in the licensed band 10 but having different RVs, to the base station 200 through the unlicensed band 20. Field values of the UL grant (DCI 0A/4A) transmitted in the unlicensed band 20 according to the transmission mode of the terminal 100 may be summarized as shown in table 1 below.

TABLE 1

| Transmission Mode | Multiplexing | Diversity |
|---|---|---|
| Carrier indicator | Carrier index of unlicensed band 20 | Carrier index of licensed band 10 |
| HARQ process number | Determined independently regardless of transmission of licensed band 10 | HARQ process number used in licensed band 10 |
| Redundancy version | Determined independently regardless of transmission of licensed band 10 | Different RV value from transport block transmitted in licensed band 10 |

Besides, the transmission mode may be defined by device settings of the terminal 100 or user settings. For example, the user of the terminal 100 may set the transmission mode in the unlicensed band 20. As another example, if a specified unlicensed band network (e.g., Wi-Fi installed in user's house or company) is recognized, the terminal 100 may determine the diversity mode as a transmission mode of an uplink; if an unlicensed band network different from the specified unlicensed band network is recognized, the terminal 100 may determine the multiplexing mode as the transmission mode.

In various embodiments, the transmission mode may be specified in advance in various manners. A transmission operation of the terminal 100 that is performed according to the specified transmission mode will be described with reference to FIG. 3.

Figure 3:
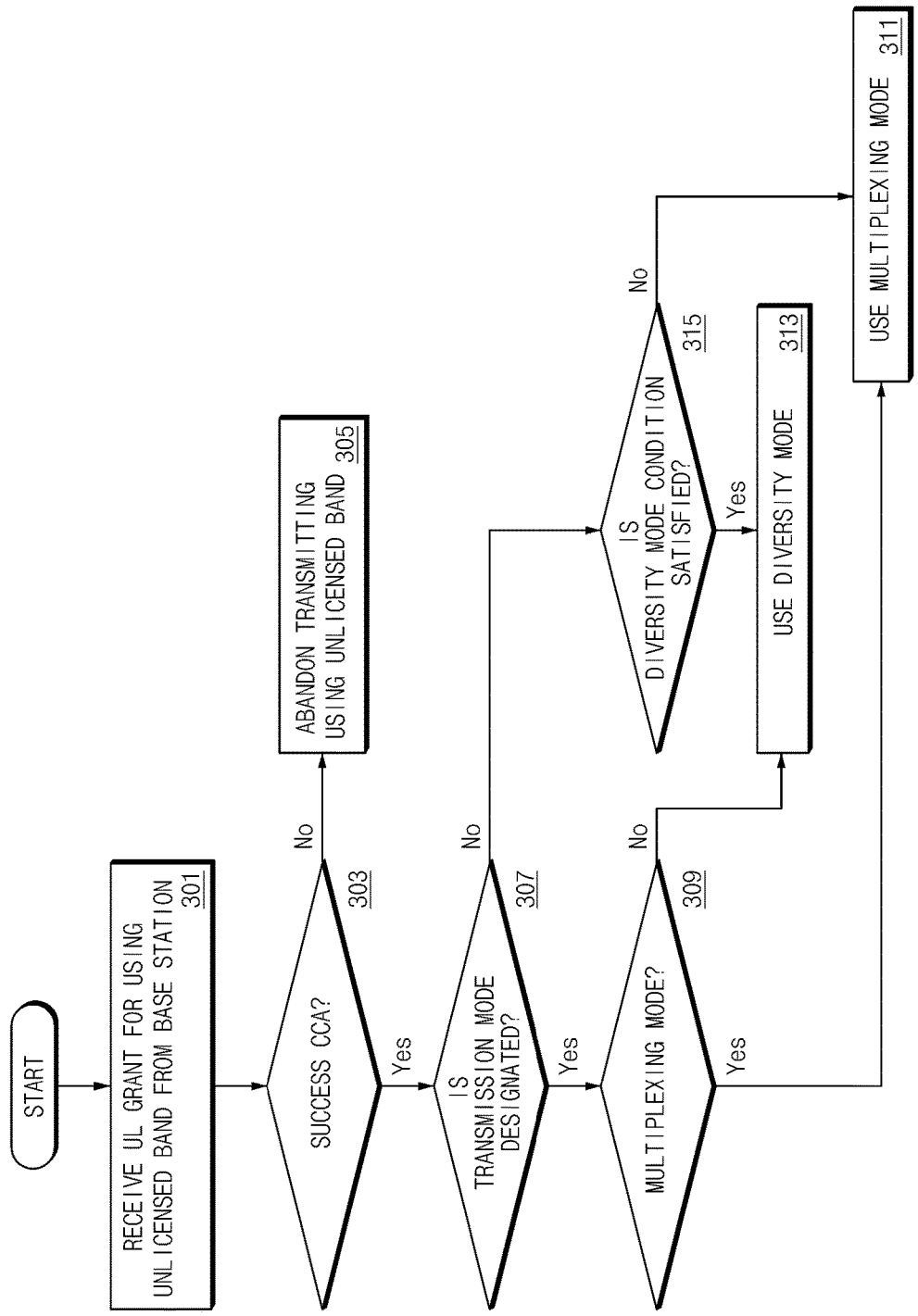
FIG. 3 illustrates a data transmission operation of a terminal according to a transmission mode, according to an embodiment of the present disclosure.
Figure 4:
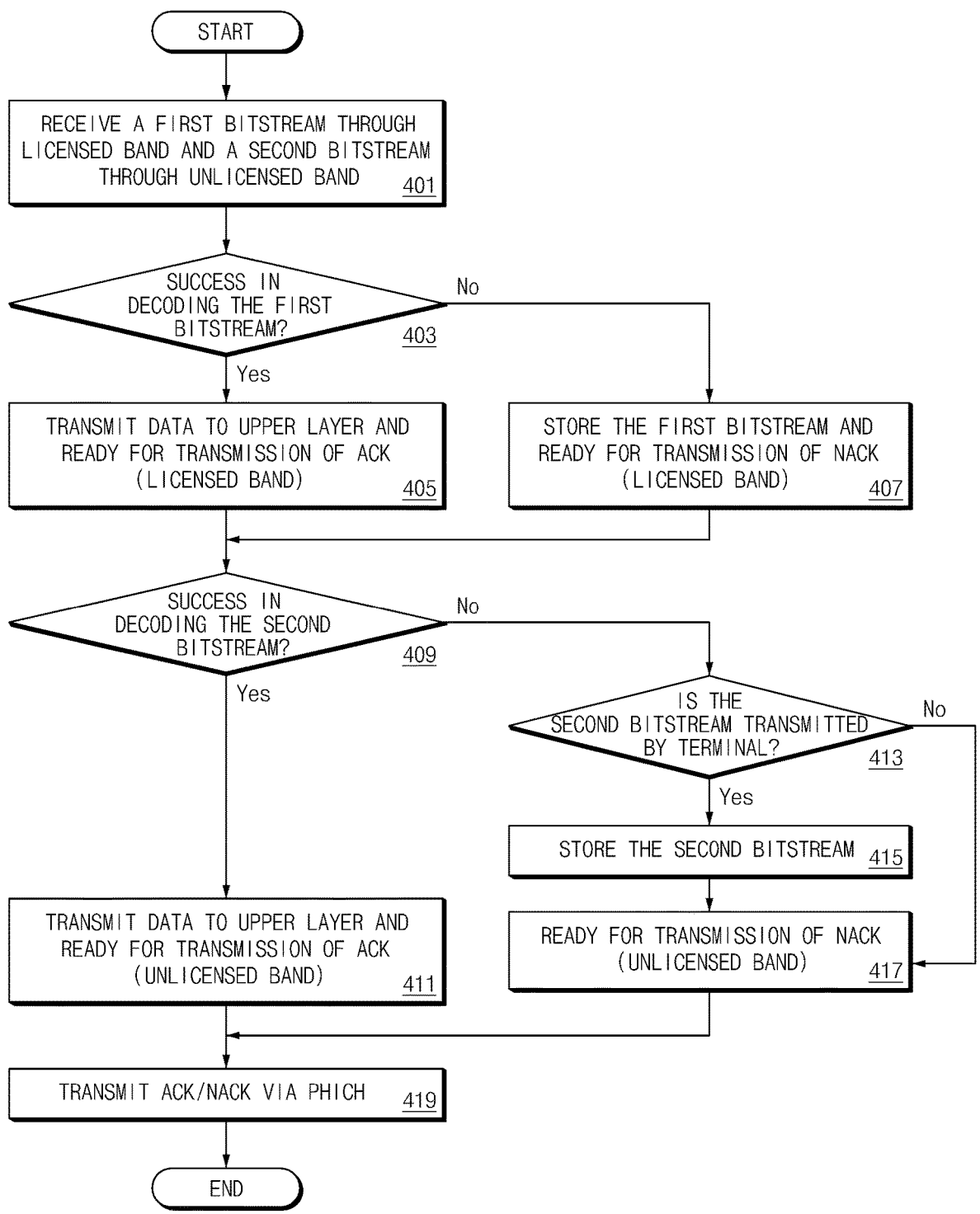
FIG. 4 is an operation flowchart if a base station recognizes a transmission mode of the terminal in a situation where the terminal performs transmission in a multiplexing mode, according to an embodiment of the present disclosure.

Referring to FIG. 3, in operation 301, the terminal 100 may receive the UL grant for using the unlicensed band 20 from the base station 200. In operation 303, the terminal 100 may perform CCA check on the unlicensed band 20 before a permitted time point (e.g., t2), for the purpose of determining whether transmission is possible at the permitted time point. If the CCA check result indicates that the unlicensed band 20 is not available, the terminal 100 may abandon transmitting using the unlicensed band 20 and may maintain a standby state with respect to the unlicensed band 20 until a next cycle.

If the CCA check result indicates that the unlicensed band 20 is available, in operation 307, the terminal 100 may check whether a transmission mode is specified by the base station 200. For example, the terminal 100 may determine the transmission mode based on a specified field value of the UL grant received through the unlicensed band 20.

If it is determined in operation 309 that the specified transmission mode is the multiplexing mode, in operation 311, the terminal 100 may transmit different data in the licensed band 10 and the unlicensed band 20. If the specified transmission mode is not the multiplexing mode, that is, the diversity mode, the terminal 100 may transmit the same data in the licensed band 10 and the unlicensed band 20. In operation 313, the data transmitted in the licensed band 10 and the data transmitted in the unlicensed band 20 may correspond to different RVs.

3.2. Case where Transmission Mode is not Specified

In an embodiment, a transmission mode that the terminal 100 will use may not be specified. If the transmission mode is not specified in advance, the terminal 100 may dynamically determine the transmission mode depending on a state of a network or the terminal 100. For example, in operation 307, the terminal 100 proceeds to operation 315. In operation 315, the terminal 100 may determine a condition corresponding to the diversity mode is satisfied.

The diversity mode condition may be defined in a variety of ways. For example:

① the terminal 100 may determine the transmission mode based on the current quality of communication (e.g., an electric field state) of the licensed band 10;

② the terminal 100 may determine the transmission mode based on an upper layer traffic characteristic;

③ the terminal 100 may determine the transmission mode based on available transmission power of the terminal 100; or ④ the terminal 100 may determine the transmission mode based on traffic level of the unlicensed band 20 to be used for transmission.

① Determining the Transmission Mode based on the Current Quality of Communication (e.g., an electric field state) of the Licensed Band: The terminal 100 may transmit data in the multiplexing mode if a signal state (e.g., a received signal strength index (RSSI), reference signal received power (RSRP), reference signal received quality (RSRQ), signal-to-noise interference (SINR), or the like) of the licensed band 10 corresponds to a strong electric field of a specified level or higher (a first threshold value or more). If an electric field of the licensed band 10 is strong, since a loss rate of data, or bit error rate, transmitted on the licensed band 10 is relatively low, transmitting different data on the unlicensed band 20 is advantageous over transmitting the same data as the licensed band 10 in the unlicensed band 20. If a signal state of the licensed band 10 corresponds to a weak electric field of a specified level or less (a second threshold value) (the second threshold value is lower than the first threshold value), the terminal 100 may transmit data in the diversity mode. If an electric field of the band 10 is weak, there may be loss of data or higher BER through the licensed band 10, and the terminal 100 may transmit the same data (having different RVs) on the licensed band 10 and the unlicensed band 20 for the purpose of increasing the probability successful reception on a receiving side (e.g., the base station 200).

In addition to the signal intensity or quality, the terminal 100 may determine the transmission mode based on whether a retransmission rate in the licensed band 10 satisfies a specified reference. For example, if a ratio of NACK of physical hybrid-ARQ indicator channel (PHICH) is not less than a given level, the terminal 100 may determine that transmission through the licensed band 10 is not smooth and may perform data transmission in the unlicensed band 20 in the diversity mode. If the ratio of NACK is low, the terminal 100 may perform data transmission in the unlicensed band 20 in the multiplexing mode.

That is, the advantages of multiplexing may be achieved by transmitting separate upper layer data by using an allocated wireless resource in the unlicensed band 20 if it is determined that transmission in the licensed band 10 is stable. In contrast, if it is determined that a state of a channel between the terminal 100 and the base station 200 is poor or interference exists in the channel (and thus, transmission in the licensed band 10 is unstable), using diversity transmission is advantageous. Diversity transmission is advantageous because the base station 200 may perform soft combining. Soft combining may be achieved by transmitting a transport block of a different RV from a transport block transmitted to the licensed band 10 by using a wireless resource allocated to the unlicensed band 20. For reference, the soft combining will be further described with reference to FIG. 8.

Table 2 shows a scenario according to electric field states of the licensed band 10 and the unlicensed band 20 has and whether the probability gain each mode has is high or low. In table 2, "Pcell" denotes a primary cell, "Scell" denotes a second cell, and "RRH" denotes remote radio head.

TABLE 2

| Electric field state | | | Multiplexing probability gain | Diversity probability gain |
|---|---|---|---|---|
| Licensed band | Unlicensed band | Actual scenario example | | |
| Strong electric field | Strong electric field | Pcell/Scell co-located, terminal located near base station | High | Low |
| Strong electric field | Weak electric field | Pcell/Scell co-located, Signal attenuation of unlicensed band > Signal attenuation of licensed band | Low | Middle |
| Weak electric field | Strong electric field | Pcell/Scell non-co-located (macro Pcell, RRH Scell, ideal backbone) | High | High |
| Weak electric field | Weak electric field | Pcell/Scell co-located, terminal located on a periphery of base station | Low | High |

② Determining the Transmission Mode based on an Upper Layer Traffic Characteristic: The terminal 100 may determine the transmission mode in consideration of a characteristic of upper layer data to be transmitted. For example, if the upper layer data to be transmitted is time-sensitive or sensitive to data loss, the terminal may operate in the diversity mode. Examples of data that is time-sensitive or sensitive to data loss include voice call data, a Voice of Internet Protocol (VoIP) packet, real-time gaming traffic, or control signaling. In contrast, when the upper layer data to be transmitted that is not sensitive to delay or data loss the like, the terminal 100 may operate in the multiplexing mode to transmit a transport block. Examples of data that is not sensitive to delay or data loss can include best effort traffic.

③ Determining the Transmission Mode based on the Available Power of the Terminal: It may be advantageous to use the diversity transmission mode when the terminal 100 has a low battery level (less than 20%), requires a low amount of power to transmit to the base station "U" of the unlicensed band (for example, a WLAN hub), and requires a high amount of power to transmit to the base station "L" of the licensed band. The terminal 100 can use low power to transmit the same data (having different RVs) to the base station U on the unlicensed band 20 and the licensed band 10. Even though the data transmitted on the licensed band 10 will be susceptible to data loss, the data from the unlicensed band 20 will be received without data loss. This can be advantageous to using the multiplexing mode, because the multiplexing mode requires high power for transmission over the licensed band 10. ④ Determine the Transmission Mode based on Traffic Level of the Unlicensed Band: The terminal 100 may measure the intensity of a signal received in the unlicensed band 20 to estimate the traffic level of a relevant channel. If the result of estimating the traffic level indicates that the probability of CCA success is less than a given level, the terminal 100 may use the diversity transmission mode in which retransmission is not performed in the unlicensed band 20. When it is determined that the frequency of retransmission due to collision is small due to a low traffic level, the terminal 100 may use the multiplexing transmission mode.

Returning to FIG. 3, if any one or more conditions of the above-described diversity mode condition ①, ②, ③, or ④ are satisfied in operation 315, the terminal 100 may determine the diversity mode as the transmission mode and may perform operation 313. However, if none of the diversity mode conditions are satisfied, the terminal 100 may use multiplexing mode 311.

The terminal 100 may manage the HARQ process and the transmission buffer in different ways depending on the uplink transmission mode. For example, if the terminal 100 operates in the multiplexing mode, the terminal 100 may perform separate HARQ processes and use separate buffers for each component carrier of the licensed band 10 and the unlicensed band 20. If the terminal 100 operates in the diversity mode, the terminal 100 may use perform one HARQ process and may use a shared buffer data transmitted on the licensed band 10 and the unlicensed band 20.

Therefore, when the diversity transmission mode is used, since the transmission blocks transmitted on each carrier of the licensed band and unlicensed band are the same (except having different RVs), the terminal 100 may save memory using a shared transmission buffer. Additionally, in the diversity mode, the terminal may maintain only one HARQ process that is common to the licensed band and the unlicensed band.

4. Base Station (Receiving Side)

The base station 200 may process data received through the licensed band 10 and the unlicensed band 20 depending on whether the base station 200 knows or does not know the transmission mode of the terminal 100. For example, the base station 200 may specify the transmission mode of the terminal 100 or may recognize the transmission mode of the terminal 100 through a control message or the like received from the terminal 100. Below, an operation of the base station 200 or a receiving side will be described with reference to FIGS. 4 to 8.

4.1. Where the Base Station Knows Transmission Mode—and the Transmission Mode is the Multiplexing Mode FIG. 4 describes the operation of the base station when the base station recognizes that terminal is transmitting in a multiplexing mode.

In operation 401, the base station 200 may receive a first bit stream through the licensed band 10 and a second bit stream through the unlicensed band 20. Since the base station 200 recognizes that the terminal 100 performs data transmission in a multiplexing mode, the base station 200 may recognize that the first bit stream and the second bit stream have different data from each other.

In operation 403, the base station 200 may attempt decoding of the first bit stream received through the licensed band 10. If the decoding of the first bit stream is successful, in operation 405, the base station 200 may transmit obtained data on an upper layer and may be ready for transmission of an ACK to the terminal 100 through the licensed band 10. If decoding the first bit stream fails, in operation 407, the base station 200 may store the first bit stream in the buffer 220 (e.g., a soft buffer) and may be ready for transmission of a NACK to the terminal 100 through the unlicensed band 20.

In operation 409, the base station 200 may attempt decoding of the second bit stream received through the unlicensed band 20. If the decoding of the second bit stream is successful, in operation 411, the base station 200 may transmit obtained data to an upper layer and may be ready for transmission of ACK to the terminal 100 through the unlicensed band 20.

In operation 409, the base station 200 may fail in the decoding of the second bit stream. For example, if an error due to interference or a channel state occurs even though the terminal 100 actually attempts transmission, the base station 200 may fail in the decoding of the second bit stream received through the unlicensed band 20. Alternatively, if transmission through the unlicensed band 20 is not performed from the beginning due to a CCA fail for the unlicensed band 20 allocated to the terminal 100, the base station 200 may fail in the decoding of the second bit stream. Since a wireless resource of the unlicensed band 20 is used not only by the terminal 100 but any other device, if the base station 200 fails in the decoding of the second bit stream received, the base station 200 may determine whether the second bit stream is transmitted by the terminal 100 or another device. There may occur the case where the base station 200 stores a received second bit stream in the buffer 220 and attempts combining with the second bit stream with the first bit stream for decoding even though the terminal 100 does not transmit the second bit stream. Such a case may result in poor performance of incremental redundancy (IR)-based HARQ. Accordingly, when the decoding of the second bit stream fails, in operation 413, the base station 200 may determine whether the second bit stream is transmitted by the terminal 100.

If it is determined that the second bit stream is transmitted by the terminal 100, the base station 200 may store the second bit stream in the buffer 220 in operation 415 and may be ready for transmission of a NACK to the terminal 100 through the unlicensed band 20 in operation 417. If it is determined that the second bit stream is transmitted another device, the base station 200 may be ready for transmission of a NACK to the terminal 100 through the unlicensed band 20 in operation 417 without performing the operation of storing the second bit stream in the buffer 220. In this case, the second bit stream may be discarded.

In operation 419, the base station 200 may transmit the ACK/NACK ready in operation 405, operation 407, operation 411, or operation 417 to the terminal 100 through the Physical Hybrid-ARQ Indicator Channel (PHICH). In an embodiment, ACK/NACK may be transmitted in operation 405, operation 407, operation 411, or operation 417, instead of operation 419.

That is, if the base station 200 recognizes that the terminal 100 transmits data in the multiplexing mode, the base station 200 may transmit ACK with respect to the licensed band 10 if receiving of data through the licensed band 10 is successful and may transmit NACK if not successful; the base station 200 may transmit ACK with respect to the unlicensed band 20 if receiving of data through the unlicensed band 20 is successful and may transmit NACK if not successful.

A method for determining whether the second bit stream is received from the terminal 100 will be described below.

Figure 5:
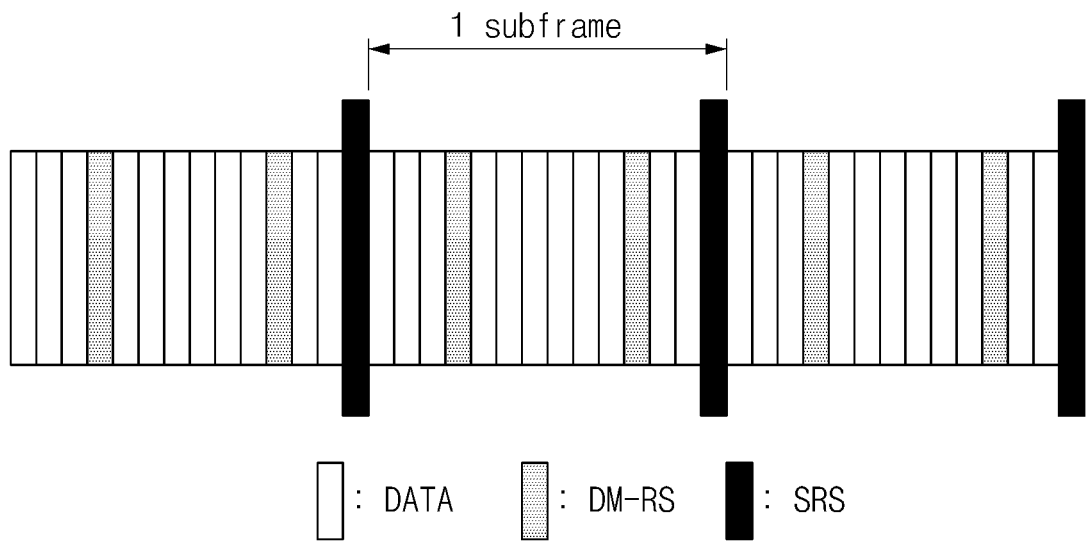
FIG. 5 illustrates PUSCH that the base station allocates to a terminal, according to an embodiment of the present disclosure.

FIG. 5 illustrates PUSCH that a base station allocates to a terminal, according to an embodiment of the present disclosure.

According to an embodiment, the base station 200 may know in advance the sequence of a demodulation reference signal (DM-RS) and a location of the resource, as the terminal 100 transmits with an uplink resource. For example, the base station 200 may allocate PUSCH composed of data, DM-RS, and SRS with a ratio illustrated in FIG. 5 to the terminal 100. If failing in decoding of a (second) bit stream received in the unlicensed band 20, the base station 200 may determine whether the second bit stream is received from the terminal 100, based on the DM-RS. For example, if a matching error is not more than a given ratio, that is, if substantially the same sequence is received as in the PUSCH, the base station 200 may determine that the second bit stream is transmitted by the terminal 100 and may store the second bit stream received in the buffer 220.

The second bit stream stored in the buffer 220 may be used for soft combining with a bit stream obtained during retransmission by the terminal 100 responding to NACK. If the terminal 100 operates in the diversity mode, the bit stream stored in the buffer 220 may be used for soft combining with the first bit stream obtained through the licensed band 10.

If the matching error exceeds the given ratio, the base station 200 may determine that the second bit stream is transmitted by another device. In this case, the base station 200 may discard the second bit stream received and may request retransmission of the transport block from the terminal 100.

Figure 6:
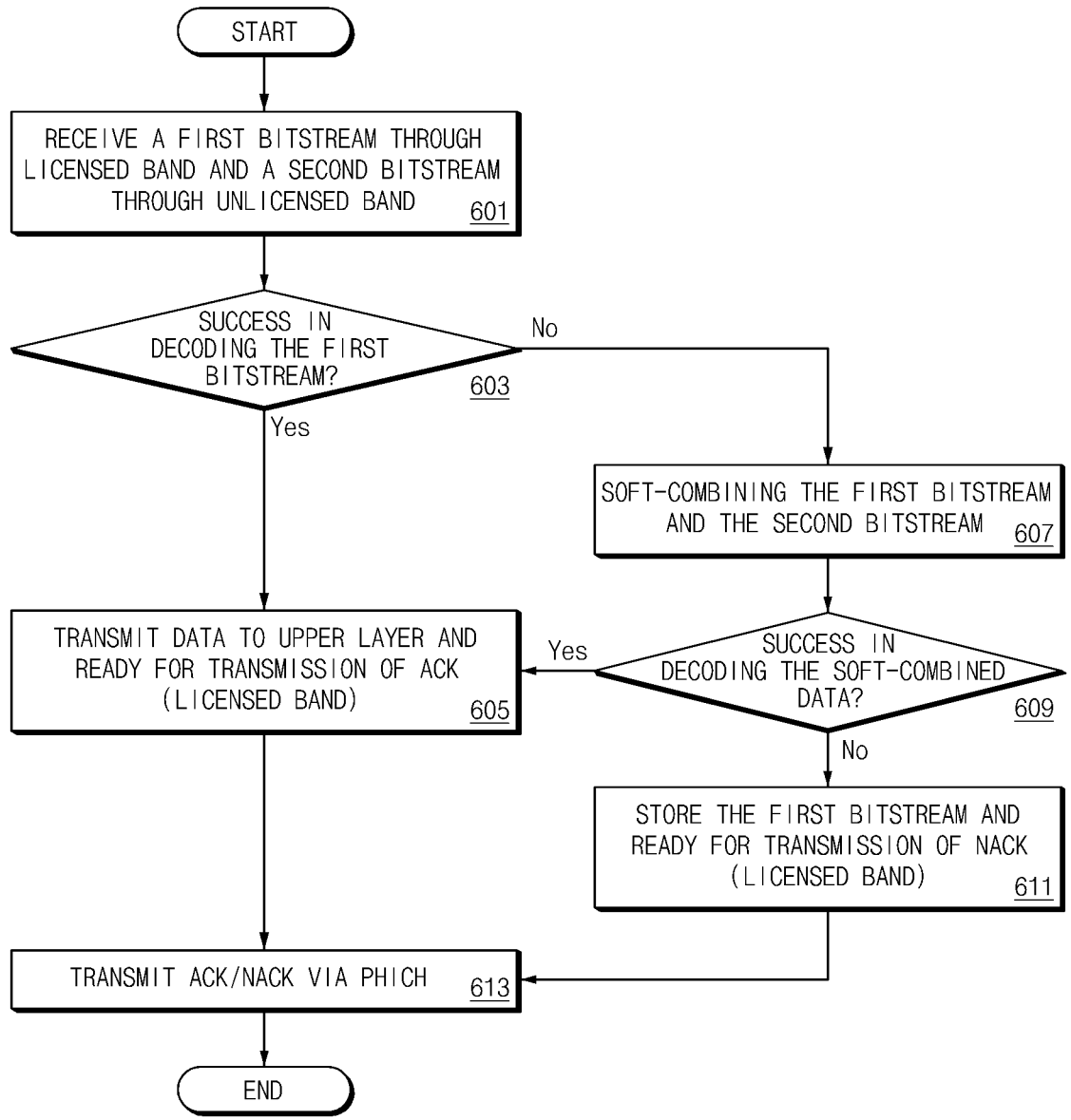
FIG. 6 is an operation flowchart if the base station recognizes a transmission mode of the terminal in a situation where the terminal performs transmission in a diversity mode, according to another embodiment of the present disclosure.

4.2. Where the Base Station Knows Transmission Mode and the Transmission Mode is Diversity Mode FIG. 6 is a flowchart describing the operation of the base station when the base station recognizes that the terminal is transmitting in the diversity mode.

In operation 601, the base station 200 may receive a first bit stream through the licensed band 10 and a second bit stream through the unlicensed band 20. Since the base station 200 recognizes that the terminal 100 performs data transmission in a diversity mode, the base station 200 may recognize that the first bit stream and the second bit stream correspond to different RVs of the same transmission data.

In operation 603, the base station 200 may attempt decoding of the first bit stream received through the licensed band 10. If the decoding of the first bit stream is successful, in operation 605, the base station 200 may transmit obtained data to an upper layer and may be ready for transmission of an ACK to the terminal 100 through the licensed band 10. This process may correspond to operation 403 and operation 404 of FIG. 4.

When the terminal 100 uses the diversity mode, since transport blocks obtained through the licensed band 10 and the unlicensed band 20 include the same transmission data (e.g., a data bit), the base station 200 may transmit ACK/NACK to one band of the licensed band 10 and the unlicensed band 20. For example, the base station 200 may transmit ACK or NACK only to the licensed band 10. In this case, since ACK/NACK reception and a retransmission operation according to the ACK/NACK reception are not performed in the unlicensed band 20, the processing load of the terminal 100 and network congestion may decrease.

If the decoding of the first bit stream fails, in operation 607, the base station 200 may soft combine the first bit stream and the second bit stream. Since the terminal 100 operates in the diversity mode, the first bit stream and the second bit stream are the same. The base station 200 can use both to attempt the decoding.

If it is determined in operation 609 that the decoding is successful, the base station 200 may perform operation 605. If the decoding fails, in operation 611, the base station 200 may store the first bit stream and may be ready for transmission of a NACK to the terminal 100.

In the process of FIG. 6, an operation (e.g., operation 413 of FIG. 4) of determining whether the second bit stream is transmitted by the terminal 100 may be omitted. Unlike the process of FIG. 4, in the process of FIG. 6, ACK/NACK transmission and data retransmission are requested with respect to the licensed band 10, and ACK/NACK or data retransmission is not requested with respect to the unlicensed band 20. Also, since it is expected that the second bit stream received includes the same data as the first bit stream, retransmission through the unlicensed band 20 is not requested when decoding of the second data stream fails. Additionally, the second bit stream might not be combined with a next transport block received through the unlicensed band 20 (the second bit stream is combined with the first bit stream transmitted only through the licensed band 10). Accordingly, even though the base station 200 fails to decode the combined first bit stream and second bit stream, the base station 200 may only store the first bit stream in the buffer 220.

In operation 613, the base station 200 may transmit ACK or NACK through PHICH of the licensed band 10.

4.3. Where the Base Station does not Know Transmission Mode

Figure 7:
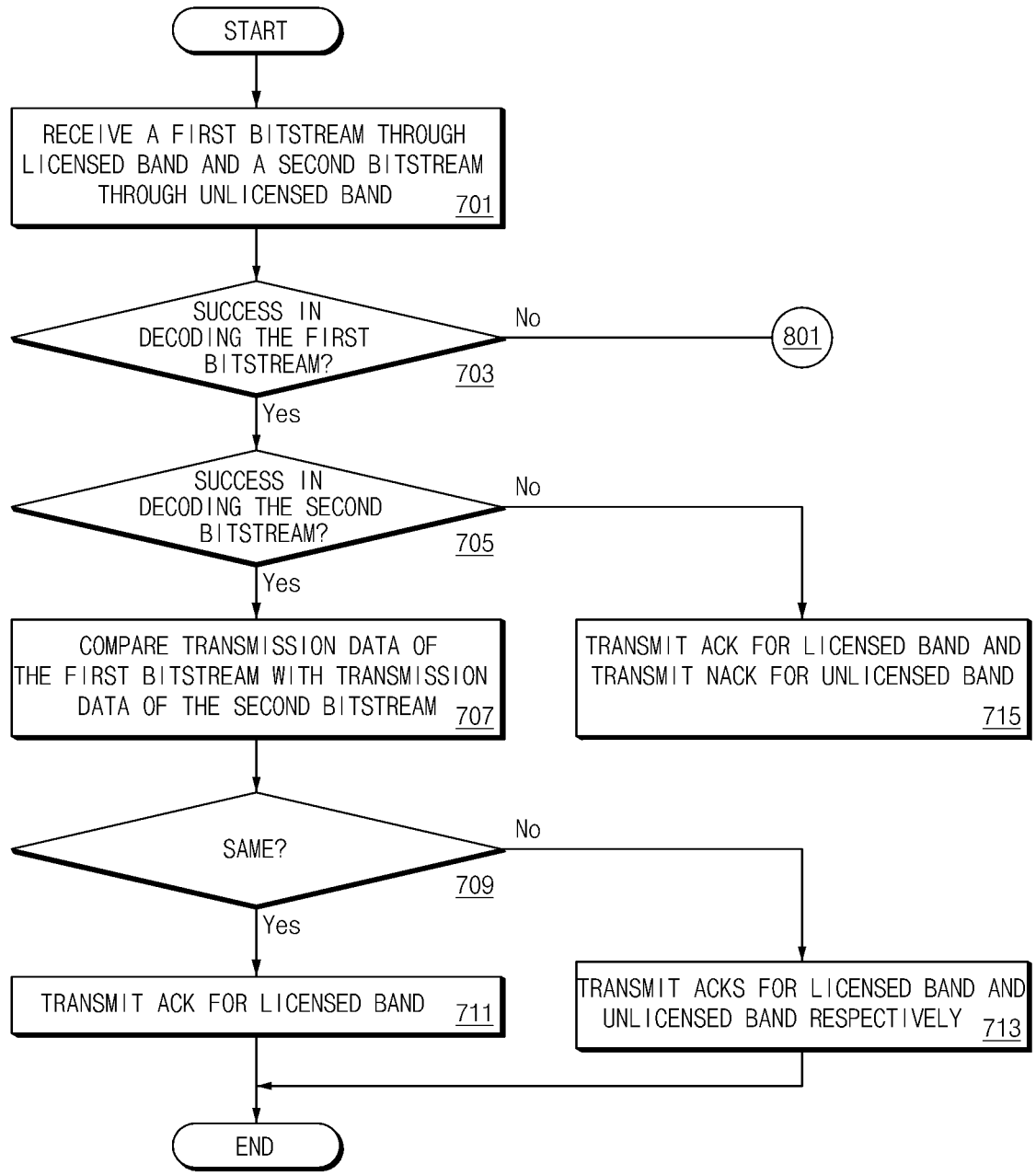
FIG. 7 and FIG. 8 are operation flowcharts if the base station does not recognize a transmission mode of a terminal, according to an embodiment of the present disclosure.
Figure 8:
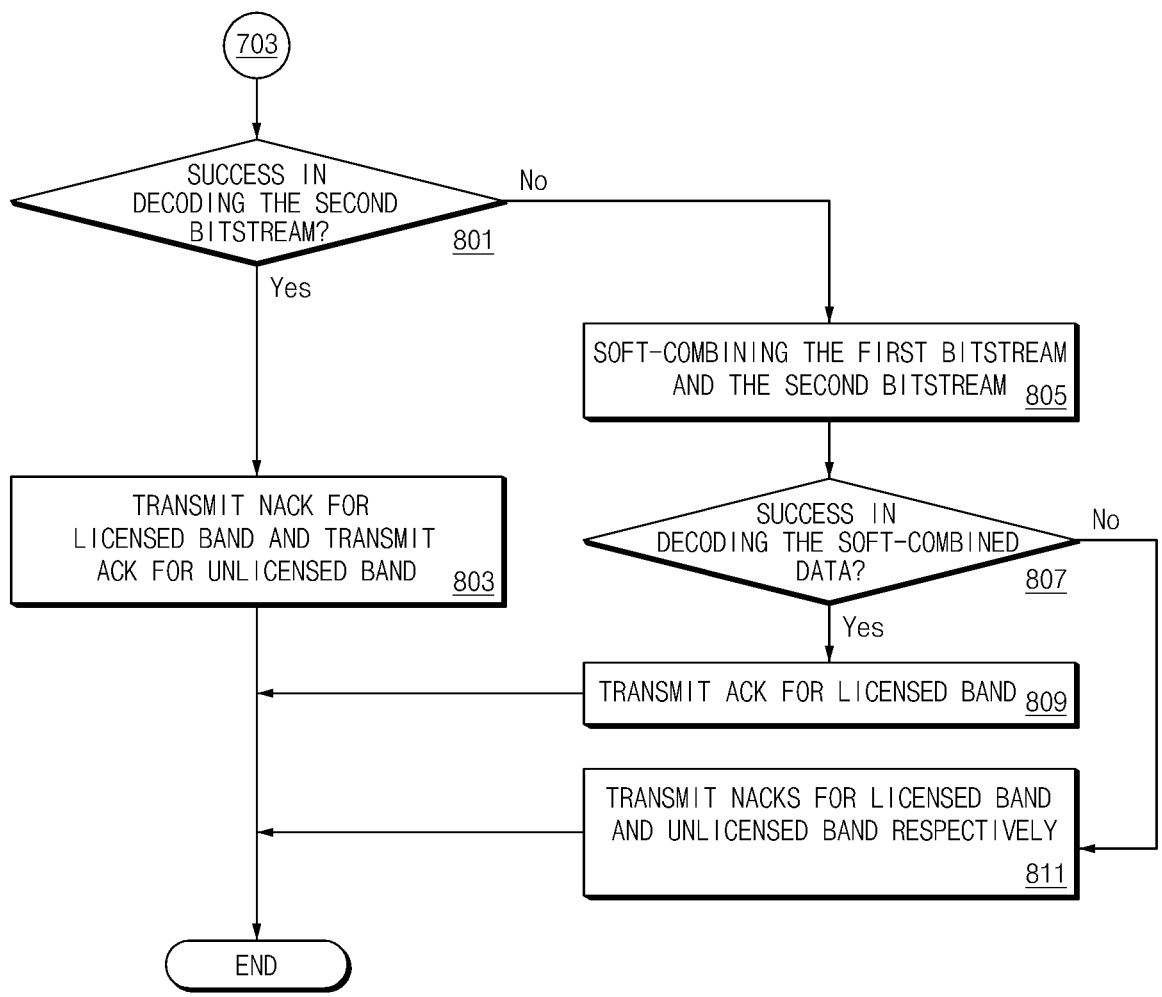

FIGS. 7 and 8 describe the operation of the base station where the base station does not know the transmission mode of the terminal, according to an embodiment of the present disclosure.

In operation 701, the base station 200 may receive a first bit stream through the licensed band 10 and a second bit stream through the unlicensed band 20.

In operation 703, the base station 200 may attempt decoding of the first bit stream received through the licensed band 10. If decoding of the first bit stream is successful, in operation 705, the base station 200 may attempt decoding of the second bit stream received through the unlicensed band 20. If decoding of the first bit stream fails, the base station 200 may perform operation 801 of FIG. 8.

If the base station 200 also succeeds in the decoding of the second bit stream, the base station 200 may transmit data obtained through the decoding to an upper layer and may compare transmission data (e.g., a data bit) of the first bit stream and transmission data (e.g., a data bit) of the second bit stream (e.g., a data bit) in operation 707. If it is determined in operation 709 that the transmission data of the first bit stream and the transmission data of the second bit stream are the same data, the base station 200 may determine that the terminal 100 performs data transmission in the diversity mode. If it is determined that the transmission data of the first bit stream and the transmission data of the second bit stream are different data from each other, the base station 200 may determine that the terminal 100 performs data transmission in the multiplexing mode.

Accordingly, if the transmission data of the first bit stream and the transmission data of the second bit stream are the same, the base station 200 may transmit an ACK with respect to only the licensed band 10 (or only the unlicensed band 20) in operation 711 because the terminal 100 transmits data in the diversity mode. If the transmission data of the first bit stream and the transmission data of the second bit stream are different from each other, the base station 200 may respectively transmit an ACK to both the licensed band 10 and the unlicensed band 20 in operation 713 because the terminal 100 transmits data in the multiplexing mode.

In operation 705, the base station 200 may fail in the decoding of the second bit stream. In this case, since the decoding of the first bit stream is successful, the base station 200 may determine that the terminal 100 operates in the multiplexing mode and may transmit an ACK with respect to the licensed band 10 and a NACK with respect to the unlicensed band 20 in operation 715. Also, the base station 200 may transmit data obtained through the decoding of the first bit stream to an upper layer. Also, the base station 200 may determine whether the second bit stream is transmitted by the terminal 100. For example, the base station 200 may perform an operation described with reference to operation 413 of FIG. 4 and FIG. 5. If the determination result indicates that the second bit stream is transmitted by the terminal 100, the base station 200 may store the second bit stream in the buffer 220. If the determination result indicates that the second bit stream was not transmitted by the terminal 100, the base station 200 may discard the second bit stream.

In the case of failing in the decoding of the first bit stream in operation 703, the base station 200 may fail or succeed in decoding of the second bit stream Referring to FIG. 8, in operation 801, the base station 200 may attempt decoding of the second bit stream received through the unlicensed band 20. If the decoding of the second bit stream is successful, in operation 803, the base station 200 may transmit a NACK with respect to the licensed band 10 and an ACK with respect to the unlicensed band 20. Also, the base station 200 may transmit data obtained through the decoding of the second bit stream to an upper layer.

If the decoding of the second bit stream fails, in operation 805, the base station 200 may soft combine the first bit stream and the second bit stream. If it is determined in operation 807 that decoding is successful by soft-combining of the first bit stream and the second bit stream, the base station 200 may determine that the terminal 100 performs data transmission in the diversity mode. Accordingly, if decoding is successful, in operation 809, the base station 200 may transmit ACK only with respect to the licensed band 10. However, if the decoding through soft-combining fails, the base station 200 may determine that the terminal 100 transmits data in the multiplexing mode and may respectively transmit a NACK with respect to the licensed band 10 and the unlicensed band 20.

Table 3 summarizes whether the base station transmits an ACK or NACK with respect to the licensed band and the unlicensed band.

TABLE 3

| Whether or not of decoding | | |
| --- | --- | --- |
| Licensed band | Un- licensed band | Base station operation |
| Success | Success | Licensed band (ACK)/Unlicensed band (ACK) Transmission of each band data to upper layer |

TABLE 3-continued

| Whether or not of decoding | | |
| --- | --- | --- |
| Licensed band | Un- licensed band | Base station operation |
| Success | Fail | Licensed band (ACK)/Unlicensed band (NACK) Transmission of licensed band decoding data to upper layer |
| Fail | Success | Licensed band (NACK)/Unlicensed band (ACK) Transmission of unlicensed band decoding data to upper layer |
| Fail | Fail | Licensed band (NACK)/Unlicensed band (NACK) |

5. Transmission Blocks with Different Numbers of Bits

In an embodiment, the numbers of transmittable bits of transport blocks of a component carrier in the licensed band 10 and a component carrier in the unlicensed band 20 may be different from each other. Since a transport block is independently managed for each component carrier, when the terminal 100 transmits data in the multiplexing mode the transmission blocks may have different numbers of bits. However, if the terminal 100 transmits data in the diversity mode, the differences in the numbers of bits of transport blocks does not need to be considered.

For example, if a channel state of the unlicensed band 20 is good as compared to the licensed band, the maximum number of bits of a transport block of the unlicensed band 20 may be greater than the maximum number of bits of a transport block of the licensed band 10. The terminal 100 may transmit one or more transport blocks decoded with respect to the licensed band 10 to the base station 200. Here, each of the one or more transport blocks may have an RV different from an RV of a transport block of the licensed band 10. As another example, the terminal 100 may transmit one transport block having a different RV from a transport block transmitted in the licensed band 10 after selecting a Modulation and Coding Scheme (MCS) level applied to the unlicensed band 20 that results in the number of transmittable bits equal to that of the licensed band 10.

In contrast, if the maximum number of bits of the transport block of the unlicensed band 20 is smaller than the maximum number of bits of the transport block of the licensed band 10, the terminal 100 may fail to transmit all bit streams in transport blocks of different RVs to the base station 200 through a wireless resource in the unlicensed band 20. In this case, the terminal 100 may transmit transport blocks to the base station 200 through a wireless resource of the unlicensed band 20 from a start time point of a transport block of an RV, where the terminal 100 transmits the maximum portion of the transport block possible on the unlicensed band 20. Since the base station 200 knows the size of a transport block to be transmitted on the unlicensed band 20, the base station 200 can increment the memory location in the buffer 220, based on the size, to store a bit stream received on the unlicensed band 20. As such, if the terminal 100 transmits only a part of a bit stream of a transport block to the base station 200 on the unlicensed band 20, and the entire bit stream corresponding to the transport block received through the licensed band 10, the whole bit stream may be still be decoded.

Additionally, various ways to select a transmission mode at the above-described uplink may be applied similarly to the case where all component carriers are present in the licensed band 10, as well as the case where a primary component carrier is present in the licensed band 10 and a second component carrier is present in the unlicensed band 20.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of the present disclosure may be, for example, implemented by instructions stored in a computer-readable storage media in the form of a program module. A computer-readable recording media may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the program instructions may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a part of the above elements may be omitted, or additional other elements may be further included. Operations performed by a module, a program module, or other elements according to various embodiments of the present disclosure may be executed sequentially, in parallel, repeatedly, or in a heuristic method. Also, part of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a processor; and
a communication circuit configured to communicate with a base station via a licensed band and an unlicensed band,
wherein the communication circuit transmits a first transport block including first transmission data to the base station through the licensed band and transmits a second transport block including second transmission data to the base station through the unlicensed band,
wherein the first transmission data and the second transmission data are different data in a first transmission mode and the first transmission data and the second transmission data are the same data in a second transmission mode,
wherein:
when a first signal state of the licensed band is strong than a first specified reference and a second signal state of the unlicensed band is stronger than a second specified reference, the processor sets a first probability of transmitting data in the first transmission mode to a first value and a second probability of transmitting data in the second transmission mode to a second value, wherein the first value is higher than the second value, and
when the first signal state is stronger than the first specified reference and the second signal state is weaker than the second specified reference, the processor sets the first probability to the second value and the second probability to be an intermediate value between the first value and the second value.

2. The electronic device of claim 1, wherein the communication circuit is configured to:
receive a transmission grant message from the base station and select the first transmission mode or the second transmission mode based on the transmission grant message.

3. The electronic device of claim 2, wherein the grant message includes a carrier indicator field indicating the transmission mode,
wherein the communication circuit is configured to:
transmit the second transport block to the base station using the first transmission mode if a value of the carrier indicator field of the grant message received through the unlicensed band indicates the unlicensed band.

4. The electronic device of claim 3, wherein the communication circuit is configured to:
transmit the second transport block to the base station in the second transmission mode if the value of the carrier indicator field of the grant message received indicates the licensed band.

5. The electronic device of claim 1, wherein when the first signal state is weaker than the first specified reference and the second signal state is stronger than the second specified reference, the processor sets the first probability to the first value and also the second probability to the first value.

6. The electronic device of claim 5, wherein when the first signal state is weaker than the first specified reference and the second signal state is weaker than the second specified reference, the processor sets the first probability to the second value and the second probability to the first value.

7. The electronic device of claim 1, wherein the communication circuit is configured to:
determine the first transmission mode or the second transmission mode based on a characteristic of data to be transmitted to the base station.

8. The electronic device of claim 7, wherein the communication circuit is configured to:
determine the second transmission mode when the data to be transmitted to the base station is a voice call packet.

9. The electronic device of claim 1, wherein the communication circuit is configured to:
determine the first transmission mode or the second transmission mode based on a battery level of the electronic device.

10. The electronic device of claim 1, wherein the communication circuit is configured to:
determine the first transmission mode or the second transmission mode based on a traffic level of the unlicensed band.

11. A data transmitting method of a terminal, the method comprising:
- when a transmission mode of the terminal is a first transmission mode, transmitting a first transport block including first transmission data to a base station through a licensed band and transmitting a second transport block including second transmission data different from the first transmission data to the base station through an unlicensed band; and
- when the transmission mode of the terminal is a second transmission mode, transmitting the first transport block to the base station through the licensed band and transmitting the second transport block including second transmission data the same as the first transmission data to the base station through the unlicensed band, wherein:
  - when a first signal state of the licensed band is stronger than a first specified reference and a second signal state of the unlicensed band is stronger than a second specified reference, setting a first probability of transmitting data in the first transmission mode to a first value and a second probability of transmitting data in the second transmission mode to a second value, wherein the first value is higher than the second value, and
  - when the first signal state is stronger than the first specified reference and the second signal state is weaker than the second specified reference, setting the first probability to the second value and the second probability to be an intermediate value between the first value and the second value.

12. The method of claim 11, further comprising:
receiving, at the terminal, a transmission grant message from the base station; and
determining the first transmission mode or the second transmission mode based on the transmission grant message.

13. The method of claim 11, further comprising:
when the first signal state is weaker than the first specified reference and the second signal state is stronger than the second specified reference, setting the first probability to the first value and also the second probability to the first value.

14. The method of claim 11, further comprising:
determining the first transmission mode or the second transmission mode based on a characteristic of data to be transmitted to the base station.

* * * * *